United States Patent Office 3,265,384
Patented August 9, 1966

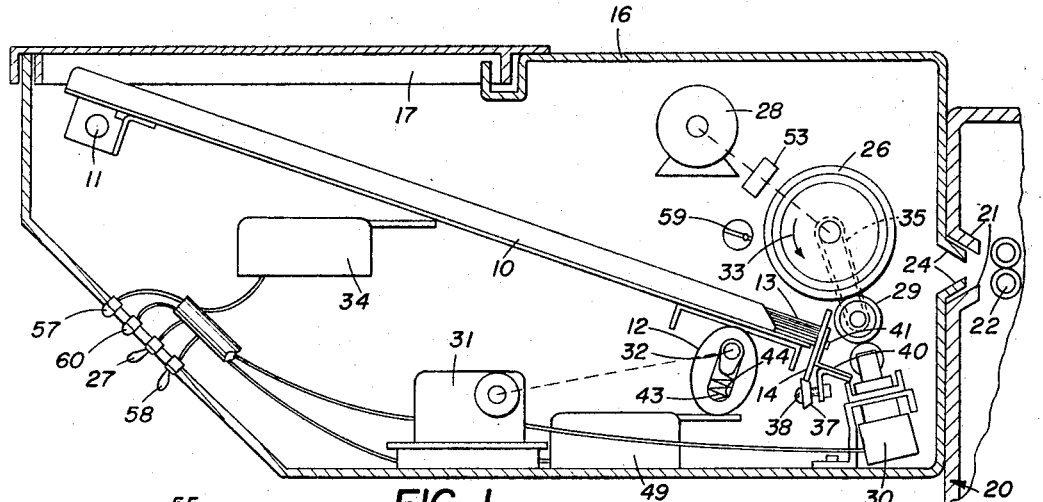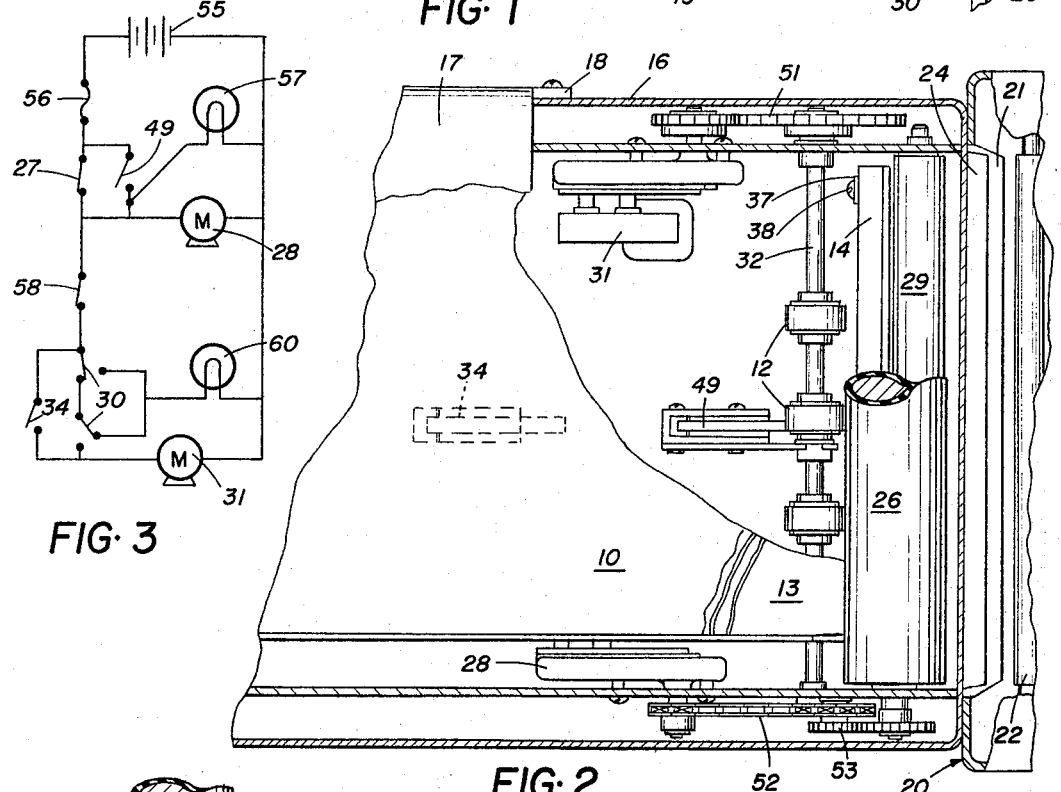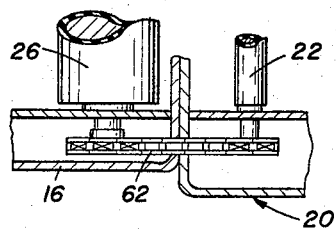

3,265,384
FILM SHEET FEEDER
Charles F. Shute, Rochester, N.Y., assignor to Eastman Kodak Company, Rochester, N.Y., a corporation of New Jersey
Filed Aug. 31, 1964, Ser. No. 393,194
10 Claims. (Cl. 271—36)

The present invention relates to a film sheet feeder and more particularly to an arrangement which may be preloaded to sequentially present a series of film sheets to a processing equipment to be developed thereby.

Several apparatus for processing film having a gelatinous coating on one or both sides are well known in the present state of the art. Apparatus of this type often takes the form of a plurality of tanks for holding developing, fixing and washing solutions and having various transport mechanisms for holding a sheet and passing it through these tanks at a predetermined rate. One of the more recent types of automatic film sheet developing processors uses self-threading roller transports whereby the film sheets move edgewise through the solutions in the tanks between a plurality of pairs of rollers which transport and guide the film therethrough. Since these transport mechanisms are self-threading, the processor requires only that an operator present film sheets one at a time in a non-overlapping sequence, to an input slot of the processor. However, the presentation of films one at a time, particularly if large sheet films are being used, is relatively slow compared to the amount of work involved. Thus, there exists a need for a film feeding arrangement which will present a plurality of films sequentially in a non-overlapping manner to an automatic roller transport film developing processor.

Therefore, an object of my invention is to provide a new and improved film feeding arrangement of the type particularly adapted for use in self-threading roller transport sheet film processors.

In accordance with one embodiment of my invention a sloping tray is arranged to support a stack of exposed film sheets such as X-ray plates adjacent to a feeding roller having a stripper bar spaced close enough to allow the passage of only one sheet at a time. After the film sheets are placed on the tray, the automatic feeder is energized whereby a resilient cam raises the tray so that a top sheet engages the feeding roller. This engagement advances the top sheet toward an outlet guide and across a detector roller which deactivates the cam raising the tray so that it may then return to a stand-by position while the first sheet continues to the processor. As soon as feeding of the first sheet has been accomplished, the detector roller moves sufficiently to energize the tray drive and thus raise the second sheet to engage the feed roller.

The subject matter which is regarded as my invention is particularly pointed out and distinctly claimed in the concluding portion of this specification. The invention, however, as to its organization and operation, together with further objects and advantages thereof will best be understood by reference to the following description taken in connection with accompanying drawing, in which:

FIG. 1 is a simplified elevation view in cross-section of one embodiment of my invention;

FIG. 2 is a top plan view, partially cut away, of the mechanism illustrated in FIG. 1;

FIG. 3 is a schematic diagram of a power circuit suitable for use with my invention; and FIG. 4 is a plan view of another embodiment of my invention.

Referring now to the drawing, wherein like reference numbers refer to similar parts, I have shown in FIG. 1 a support tray 10 rotatable at one end about a pivot 11.

Raising of the other end of the tray 10 is accomplished in accordance with the operation of a rotatable cam lifter 12 near the other end. I have found that attempts to use solenoids for this raising of the tray are not most satisfactory. As illustrated, a stack of film sheets 13 have been placed on top of the tray 10 and rest at the lower end thereof against a stripper bar 14. A housing 16 for the tray 10 completely encloses it and the film sheets 13 thereon with a cover 17 being retractable about a hinge 18 (FIG. 2) for loading purposes. The cover 17 completes the light tight enclosure when in a closed position as illustrated.

An input end of an X-ray film processor 20 is indicated at the left of FIG. 1 and has an inlet aperture defined by flaps 21. An initial pair of drive rollers 22 receive the film sheets 13 and transport them toward the processing tanks (not shown) within the processor 20. The housing 16 of the feeding apparatus is also provided with a pair of flaps or guide plates 24 which extend between the flaps 21.

The function of my invention, as should now be apparent, is for a feed roller 26 to drive the exposed film sheets 13 one at a time between the guide plates 24 to the processor input rollers 22. Since the tray 10 is sloping, the top sheet will always be in a position to be engaged by the feed roller 26. Once the tray 10 is loaded and the cover 17 is repositioned, a main switch 27 of the feeder is turned on. Closing of the switch 27 energizes a feed roller drive motor 28. Since no film sheets lies between the feed roller 26 and a detector roller 29, a microswitch detector 30 is in a closed position to initiate operation of a cam drive motor 31. Operation of this motor 31 rotates a shaft 32 supporting the cams 12 to lift the tray 10 so that the lower end of a top film sheet engages the feed roller 26, to be driven by rotation of the feed roller 26 as indicated by an arrow 33 past the detector roller 29 toward the guides 24.

As soon as the leading edge of a film sheet passes over the roller 29 the switch 30 is opened so that the motor 31 may be de-energized. However, in order to prevent unnecessary scuffing of the sheets 13, the cam drive shaft 32 is not stopped in the raised position. Instead, a second switch 34 has been closed in accordance with the lifting of the tray 10 and is coupled to shunt the switch 30. The switch 34 is arranged to engage the lower portion of the tray 10 when in the lowermost position so that this switch which is normally closed when the tray is lifted and thus maintains energization of the motor 31 until the tray 10 again reaches the lowermost position. The opening of the switch 34 stops the motor 31 until the film sheet being fed passes beyond the detector roller 29. At that time the detector roller 29 is again raised to contact the feed roller 26 by a suitable spring means as indicated at 35.

In order that the film sheets 13 are fed one at a time by the feeder roll 26, the elevation of the stripper bar 14 is controlled by a plurality of champhered washers 37 positioned thereunder and accurately positionable by threaded bolts 38. I prefer that the spacing between the feeder roller 26 and the stripper bar 14 be of the order of .014 of an inch when processing film sheets of about .009 of an inch thickness. Each end of the stripper bar 14 is thus adjusted and, at least one central bolt 38 is also adjusted to assure this clearance. When the adjustment of the stripper bar 14 is completed, it is secured to a frame member 40 by a plurality of bolts 41. Thus prevention of double feeding is assured.

In order that compression damage of the film sheets does not occur, we prefer to have the eccentric cams 12 be resiliently supported on the shaft 32 as by springs indicated at 43. The springs 43 reside in slots or recesses 44 to provide a resilient drive of the cam 12. Also positioned to be sensitive to the rotation of the cams 12 is a feeler switch 49, which is coupled in parallel with the main switch 27 so that the cam mechanism stops only with the cams 12 in the lowered position. Thus the tray 10 is prepared to be loaded for a next sequence of feeding operations. Also the switch 49 does not cause operation of the motors 28 and 31 if the tray 10 is raised or removed during loading or maintenance of my invention.

Referring now to FIG. 2 the motor 31 is coupled to the shaft 32 of the cams 12 by reduction gearing 51 such that the cam shaft rotates at about two revolutions per minute. As will become apparent, the speed of the feed roller 26 controls the velocity of the sheet feed and the speed of the shaft 32 controls the spacing of the film sheets in the processor 20. The motor 28 is coupled to the feed roller 26 by a chain drive and sprocket system 52 such that the surface velocity of the roller 26 corresponds to or is less than that of the rollers 22. This surface velocity will be of the order of 10 or 20 inches per minute for most of X-ray film processors currently being sold. In order to assure synchronization of the rollers 26 and 22, I prefer to insert in the drive system a unidirectional slipping clutch 53 which may be over driven by the rollers 22 pulling a film sheet faster than the feed roller 26 is being driven.

As discussed above, operation of the shaft 32 at about two revolutions per minute results in about 2 inches spacing when the cams 12 must be raised about ¼ revolution to bring about engagement of a top sheet of the stack. One and one-half inch of this spacing is due to the time of the raising of the stack while a preceding sheet progresses through the roller transport of the processor 20, and the other one-half inch results from the spacing between the top sheet of the stack and the detector roller 29. Spacing less than this raises unnecessary possibilities of intreference between two consecutive film sheets 13. Because of this possible interference, I have arranged the tray cam drive system to assure the cam 12 being a lowered position when a next sheet is called for by the switch means 30.

Referring now to FIG. 3, a power supply, which may be a plug suitable for connection to the usual 120-voltage A.C. sources or a battery 55 as indicated, supplies power through a fuse 56 to a main switch 27, with the switch 49 being coupled in parallel therewith as discussed above. The switch 27 directly energizes the feed roller motor 28 and indirectly energizes the motor 31. An indicator lamp such as a neon lamp 57 is coupled in parallel with the motor 28 to indicate energization thereof.

An auxiliary cut-out switch 58 is provided so that during a rush operation of my invention, the motor 28 may be operated without operation of the motor 31 whereby film sheets may be hand fed to this feeder system without removing the automatic feeder device of the present invention. Since the rotation of the cams 12 is only about two or three revolutions per minute it is a relatively simple matter to stop the tray drive system when the tray is in an uppermost position whereby the film sheets may be fed directly. The uppermost position of the tray is determined by a precisely adjustable limit means 59 which engages the top of the tray when in the maximum raised position. Thus the minimum spacing between the feed roller 26 and the surface of the tray is established at about .009 inch when using film sheets of that thickness.

Also illustrated in FIG. 3 is the detector switch 30 illustrated as two serially coupled single pole, double-throw switches, one being located at each end of the detector roll 29 whereby operation of either one of the switches will energize an indicator lamp 60 to show that film is being processed. Operation of either switch also opens the circuit to the motor 31 in response to movement of the detector roll 29. The switch 34 is also shown in the open position which occurs at any time the cam drive 12 is in a lowermost position as indicated in FIG. 1. Thus the switches of FIG. 3 indicate a feeding operation is in progress with the tray 10 in a lowered position.

Referring now to FIG. 4 I have shown a modification of the present invention wherein the feed roller 26 is driven in accordance with the driving of the rollers 22 through a sprocket and chain drive arrangement 62. When using such a sprocket and chain drive arrangement the velocity and thereby the synchronization of the feed roller 26 is directly controlled by the processor 20.

While I have shown particular embodiments of my invention other modifications may occur to those skilled in this art. Therefore, I intend the appended claims to cover all such modifications that fall within the proper scope of my invention.

I claim:

1. A film sheet feeder for sequentially supplying exposed film sheets in an edgewise fashion to a film processor, comprising:
  a sloping tray for holding a stack of sheets;
  a feed roller located over the lower end of said tray;
  a cam drive means operable to periodically raise the lower end so that a top sheet of the stack is engaged by said roller to be driven thereby to the processor input;
  a stripper bar positioned to engage the lower end surface of each of the sheets of the stack and being spaced from said roller a distance allowing passage of only one film sheet;
  a motor coupled to drive said cam means to raise and lower said tray;
  first switch means responsive to the feeding of a sheet by said roller to energize said motor only when a sheet is not being fed thereby; and
  second switch means coupled in parallel with said first switch means and responsive to the position of said tray to energize said motor only when said tray is in a raised position whereby said tray stops in a lowered position during a feeding operation.

2. A film sheet feeder as in claim 1 in which said cam means is resiliently drivable to a position that will result in maximum elevation of said tray whereby a thick stack of sheets will prevent such maximum elevation by compression of resilient means without pressure damage to the sheets.

3. A film sheet feeder as in claim 1 having:
  a second motor for driving said roller;
  main switch means for energizing said second motor and the circuit of said first and second switch means; and
  another switch means coupled in parallel with said main switch means and operable to open only when said cam drive means is in a lowered position.

4. A film sheet feeder as in claim 1 having a third switch means in series with said first and second switch means and selectively operable to stop said tray in a selected position so that the film sheet feeder may be supplied individual sheets without running of said motor.

5. A film sheet feeder as in claim 4 having a limit means for determining the maximum elevation of the lower end of said tray so that a single sheet may be driven by said roller from said tray.

6. A sheet feeder for sequentially supplying exposed film sheets edgewise to a roller transport mechanism of a film processor, comprising:
  a sloping tray for holding a stack of sheets at its lower end;
  a feed roller located over the lower end of said tray;
  means for driving said feed roller at the same surface speed as a first pair of input rollers of the roller transport mechanism;
  a cam drive means operable to periodically raise the lower end of said tray so that a top sheet of the stack is engaged by said roller and driven thereby to the processor input rollers, said cam drive means being of the off-center type with the larger portion thereof defining a recess;

a spring compressed within the recess of said cam means to determine the upward pressure of the stack against said feed roller;

a stripper bar positioned to engage the lower end surface of each of the sheets of the stack and being spaced from said feed roller a distance allowing passage of only one film sheet at a time;

a motor coupled to drive said cam means to raise and lower said trays;

first switch means responsive to the feeding of a sheet by said feed roller to energize said motor only when a sheet is not being fed thereby; and second switch means in parallel with said first switch means and responsive to the position of said tray to energize said motor only when said tray is in a raised position whereby said tray stops in a lowered position.

7. A sheet feeder as in claim 6 in which said drive means includes another motor and a speed reduction coupling between the motor and said feed roller, and switch means for energizing the other motor so long as said drive cam means causes said tray to reside in a raised position.

8. A sheet feeder as in claim 5 in which said motor drives said cam drive means at a velocity relative to the velocity of the roller transport mechanism such that the individual sheets are spaced apart by at least about 2 inches.

9. A film sheet feeder for sequentially supplying exposed film sheets edgewise to a roller transport mechanism of a film processor, comprising:

a sloping tray for holding a stack of sheets;

a feed roller located over the lower end of said tray;

means for driving said feed roller at a velocity corresponding to that of a first pair of rollers of the roller transport mechanism;

an over driveable slipping clutch coupled in said drive means so that the first pair of rollers may pull a film sheet at a higher velocity than it is driven by said feed roller;

first detecting means for detecting the passage of a sheet from said feed roller to the roller transport mechanism for developing a signal to start a next sheet;

a cam drive means operable in response to said signal to raise the lower end of said tray so that a top sheet of the stack is engaged by said feed roller and driven thereby to the processor input rollers; and other detecting means arranged to assure said tray being in a lowered position when a next sheet is called for by said signal whereby the spacing between sheets will be at least about two inches.

10. A film sheet feeder as in claim 9 wherein said first detecting means is spaced from the point of engagement between the stack and said feed roller by about one-half inch and the drive of said cam means is of a velocity allowing at least about one and one-half inches movement of the surface of said roller prior to starting the next sheet.

References Cited by the Examiner

UNITED STATES PATENTS 1,140,884 5/1915 Dick _____ 271—22

FOREIGN PATENTS 1,088,510 9/1960 Germany.

RAPHAEL M. LUPO, *Primary Examiner.*

H. S. LANE, *Assistant Examiner.*